(No Model.)
H. M. RABUN.
FRUIT GATHERER.
No. 522,492. Patented July 3, 1894.
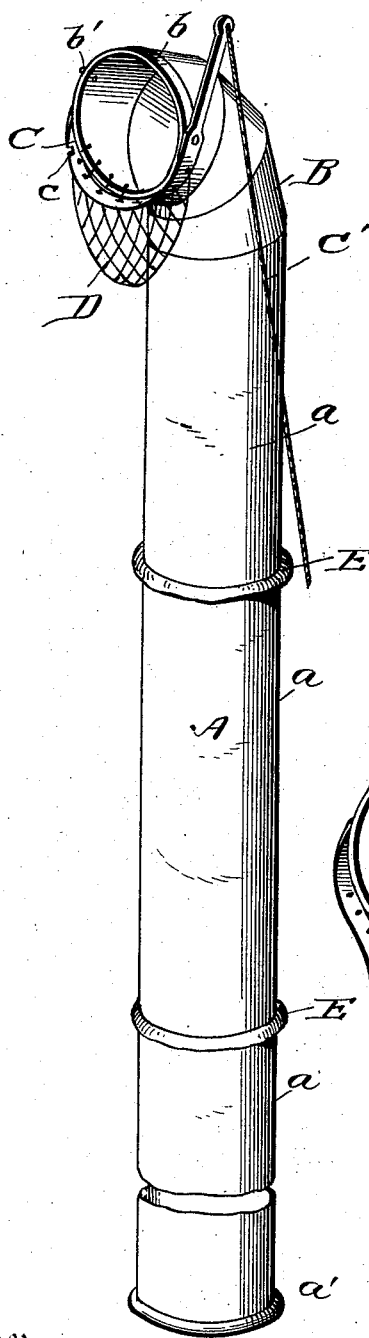
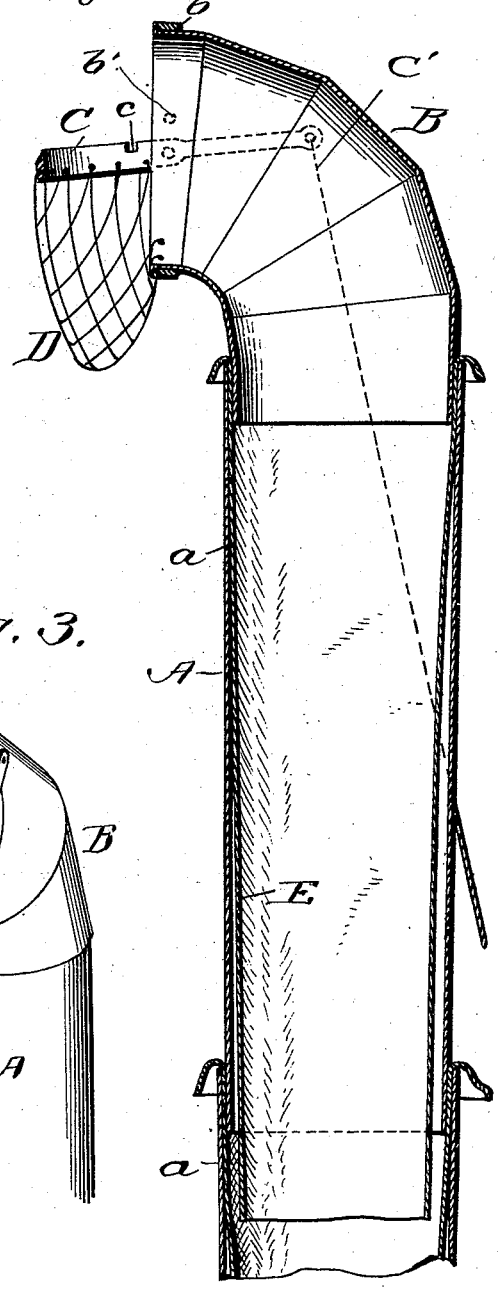
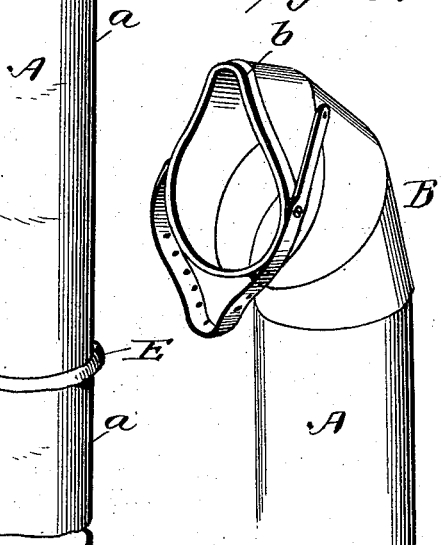
Witnesses
Inventor
Hugh M. Rabun,
By R. S. & A. P. Lacey
Attorneys

UNITED STATES PATENT OFFICE.

HUGH M. RABUN, OF BALTIMORE, MARYLAND, ASSIGNOR OF ONE-HALF TO JOHN ULINE, OF SAME PLACE.

FRUIT-GATHERER.

SPECIFICATION forming part of Letters Patent No. 522,492, dated July 3, 1894.

Application filed March 16, 1894. Serial No. 503,915. (No model.)

*To all whom it may concern:*

Be it known that I, HUGH M. RABUN, a citizen of the United States, residing at Baltimore, in the State of Maryland, have invented certain new and useful Improvements in Fruit-Gatherers; and I do hereby declare the following to be a full, clear, and exact description of the invention, such as will enable others skilled in the art to which it appertains to make and use the same.

This invention relates to an improved fruit gatherer the object being to provide a device by means of which the fruit can be picked from the tree and conducted to the hand of the operator.

Another object is to so construct the device that the fruit will be prevented from injury during its descent, and another object is to construct a cheap, light and simple device composed of a series of sections whereby fruit at any height can be gathered.

With these objects in view my invention consists in the peculiar construction of its various parts and the novel construction or arrangement all of which will be fully described hereinafter and pointed out in the claims.

In the drawings forming a part of this specification, Figure 1 is a perspective view of my improved fruit gatherer. Fig. 2 is a sectional view of the same. Fig. 3 is a detail view of the head portion.

In the practical embodiment of my invention I employ a thin light metallic tube A composed of a series of sections $a$ the ends of which are so shaped that they fit closely and thus produce a rigid tube. In the top of the upper section is inserted an elbow B and to the outer end of said elbow is secured a metallic ring $b$. Pivoted to this metallic ring is a cutting blade or knife C said blade or knife being semi-circular in form and pivoted at its ends to the band $b$. One end of the blade is extended beyond the pivotal point and to said end is attached a cord C' by means of which the blade is drawn up to the mouth of the tube and the fruit severed from the tree. The blade is sharpened so that it cuts readily and it is also made quite heavy so that it will drop back quickly as soon as the cord is released. To prevent the blade swinging too far I arrange a pin $b'$ upon the band $b$ and cut a notch $c$ in the blade C to receive said pin. This pin acts as a stop and prevents the blade going so far that it cannot drop back. The blade and band each have a series of perforations produced therein, and passing through these perforations are the cords D D which form a net at the mouth of the tube and prevent the fruit falling outside after it has been severed.

In order to protect the fruit from damage during its descent I provide a lining E of some soft material such as flannel, said lining being tubular in shape and it is secured within the tube by turning the upper ends of the same over the upper edges of the section it is to line and then inserting the lower end of the adjacent upper section. The lower end of the lining being full within the tube. In this way I provide and secure a soft lining that will enable the fruit to fall a considerable distance without being bruised or scraped. The bottom of the tube is formed with a round edge $a'$ so that it can rest in the operator's hand without injury to the hand.

In Fig. 3 I have shown the mouth of the tube and the blade shaped to gather pears and similar fruit, the form shown in the other views being constructed to gather peaches, apples and other round fruit.

The tube being of sheet metal is sufficiently rigid to dispense with all supports and being of very thin metal it can be conveniently carried about and held in the hand during the operation of gathering.

Having thus described my invention, what I claim, and desire to secure by Letters Patent, is—

1. In a fruit gatherer the combination with a thin metallic tube formed of a series of sections, of a soft fabric lining within said tube said lining being made also in sections, the upper end of each lining section being secured between the ends of the metallic sections, substantially as shown and described.

2. In a fruit gatherer, the combination with a metallic tube composed of a series of sections and carrying an elbow at its upper end, provided with a cutting device, of a soft fabric lining made also in sections and arranged within the tube, the upper end of each lining section being secured between the ends of the metallic sections, substantially as shown and described.

In testimony whereof I affix my signature in presence of two witnesses.

HUGH M. RABUN.

Witnesses:
JOHN R. RILEY,
THEO. M. LEARY.